Feb. 25, 1969   M. R. H. BROOKS   3,429,354
TIRE CORD CONSTRUCTIONS AND TIRES MADE THEREWITH
Filed Feb. 7, 1966
FIG.1
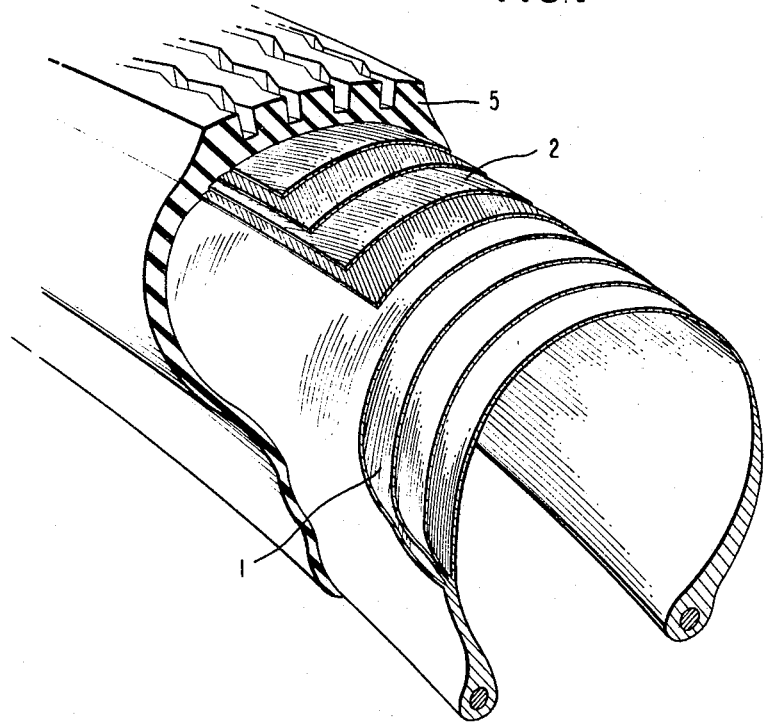
FIG.2
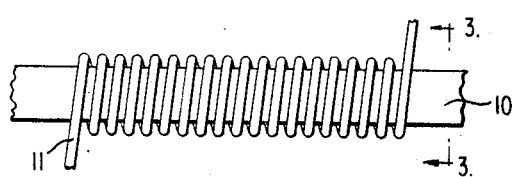
FIG.3
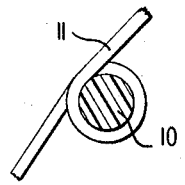
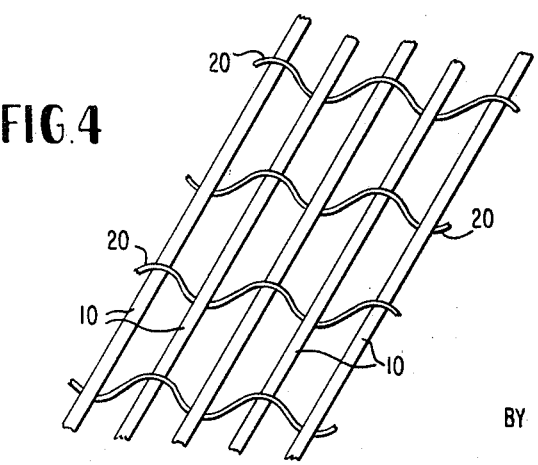
FIG.4
INVENTOR
MALCOLM R. H. BROOKS
BY
ATTORNEY United States Patent Office 3,429,354
Patented Feb. 25, 1969

3,429,354
TIRE CORD CONSTRUCTIONS AND TIRES MADE THEREWITH
Malcolm R. H. Brooks, Waterloo, Belgium, assignor to Celanese Corporation, a corporation of Delaware
Filed Feb. 7, 1966, Ser. No. 525,425
U.S. Cl. 152—357      9 Claims
Int. Cl. B60c 9/02; D02g 3/02, 3/36

ABSTRACT OF THE DISCLOSURE

A composite cord and rubber tires prepared therefrom the composite cord comprising a load-carrying substantially untwisted polyester monofilament core having a plural end hydrophilic yarn helically wound thereon.

---

This invention relates to a fiber product of improved adhesion characteristics and more particularly to an improved polyester monofilament useful in reinforcing rubber containing articles. Still more particularly the invention relates to polyester monofilaments wrapped with a hydrophilic cellulosic yarn having a plurality of ends, e.g., yarn of rayon, cotton, sisal, etc., and to the use of such wrapped monofilaments in rubber containing articles such as V-belts, conveyor belts, pneumatic tires in general, and radial tires in particular.

The difficulty of producing good adhesion between synthetic fibers such as polyethylene terepththalate and rubber and has been a hindrance to their commercial adoption in fields such as pneumatic tire construction although such fibers possess high strength and low extensibility, i.e., a combination of properties particularly desired in radial tires.

The demand for radial tires has been increasing in recent years because they tend to have longer tread life and result in lower fuel consumption than conventional tires. High rigidity in both lateral (radial) and longitudinal (circumferential) directions gives radial tires their main advantage. Because of their two-part reinforcing structure, radial tires also have the advantage over conventional tires in that they permit designing their carcass and tread portions independent of each other for optimum performance.

A conventional tire contains essentially a single textile reinforcing structure composed of an even number of rubber-coated cord fabric plies which hold the tire together under varying dynamic and static conditions. A typical conventional passenger car tire thus contains about 2 pounds of rayon or nylon cord. In building such a conventional tubeless tire a layer of suitably compounded elastomer such as butyl rubber which eventually acts as the air bladder is first wrapped around a horizontal cylinder building drum overlapping it at each end. A ply of rubber-coated tire cord fabric is placed on top of the rubber layer in such a manner that the cords form a bias angle of about 55° to 65° to the center line of the drum and a second ply of like fabric is then placed on top of the first ply, with the cords again forming a bias angle of about 55° to 65° to the center line but lying in the opposite direction from the first ply.

When the desired number of cord fabric plies have been added, steel beads are placed at each edge of the drum and the overlapping rubber and fabric are folded back over the beads. Additional layers of a suitable rubber compound, usually filled with carbon black, are then successively placed on top of the last ply of fabric to form the sidewalls and tread. At this stage the drum is collapsed and the cylindrical green tire is removed to be finally formed and cured in a curing press. After such forming and curing the cords in the sidewalls maintain approximately their original 60° angle to the mid-circumferential plane of the tire whereas those in the tire crown or tread area finish up at an angle of about 35°.

In contrast to the single reinforcing structure of the conventional tire a radial tire contains two separate reinforcing structures that perform two different functions, namely, reinforcement of the tire carcass and reinforcement of the tire tread. The cords in the carcass of such a tire form a bias angle of about 80° to 90° to the mid-circumferential plane of the tire and consequently can be said to lie in a "radial" direction when such a tire has been formed. Hence its name. The fabric structure in the tread portion of such a tire is separate from the fabrics of the carcass and makes up what is known as the belt of a radial tire. Thus, where a conventional tire has substantially the same amount of cord fabric in its sidewall and tread supporting portions, a typical radial tire commonly contains about 2 to 3 times more cord fabric in the belt than in the carcass.

The initial stages of building a radial tire are similar to those of a conventional tire except that the cords form approximately a right angle to the mid-circumferential portion of the building drum and of the eventual formed tire. When one or more carcass plies have been added as desired, sidewall rubber is placed on top of the last ply of fabric, the drum is collapsed and the tire carcass removed and formed substantially into its final shape, without curing. The tread portion of the tire is then made separately by placing rubber around the building drum, one or more plies of fabric on top of the rubber to form a reinforcing belt, and finally the tread rubber on top of the last ply of fabric. The angle that the cords in the belt form to the drum center line may vary between about 0° and 15°. The drum is then collapsed and the reinforced green tread portion is removed and placed around the previously formed green carcass, whereupon the assembled green tire is put into a tire mold and cured. The tire cannot normally be built in one stage due to the inextensibility of the tire tread portion, such inextensibility being one of the features of a radial tire.

Some of the important advantages of radial tires are due to the fact that the cords in their carcass lie in the best direction for load carrying and road holding. When in motion, the uppermost cords are under tension and, unlike in a conventional biased cord tire, carry practically all the load in a vertical direction. To perform this function cords of high tensile strength can be used in a single-ply construction or in a construction employing an odd number of plies, thus simplifying fabrication.

Tire tread rigidity being among the most important factors of radial tires, such tires currently on the market commonly use brass-plated steel cords in both carcass and belt. However, this produces uncomfortably hard rides. Attempts to obtain softer riding radial tires have been made using rayon in both carcass and belt. In this case, however, to obtain the desired tread rigidity a belt structure composed of as many as six plies of rayon cord have to be used, thereby losing some of the other important advantages of a radial tire. In a single-ply construction such a heavy rayon cord must be used for strength that a serious handling problem results.

The use of synthetic fibers such as nylon has not been found practical in radial tire cords because such fibers have a relatively low modulus of elasticity, i.e., relatively high elongation under stress. Glass fibers also leave much to be desired because their low breaking elongation requires the use of very low denier filaments in the form of plied yarns giving the requisite strength. Plied yarns or multifilaments generally, however, result in a reduced initial modulus and therefore are less advantageous for radial tire cords than monofilaments of comparable load carrying capacity. Some multifilament yarns such as rayon, moreover, have low bending stiffness. Therefore, in order to obtain the required rigidity more plies of fabric have to be used than are required to obtain the needed strength. This is a particular disadvantage in making radial tire belts. To increase the bending stiffness without changing the intrinsic nature of a fiber the filament diameter can be increased but this is practical with only a few fibers having the desired modulus, notably with the melt-spun fibers such as super polyester, e.g., polyethylene terephthalate.

Many of the cord materials mentioned above additionally present problems in that they are relatively difficult to adhere to rubber when treated in one of the manners well known in the art, e.g., by dipping in an aqueous composition such as a water solution containing a water-soluble adhesive, e.g., a resorcinol-formaldehyde resin, or an aqueous rubber latex dispersion or by dipping the cord in different such dips in sequence. Monofilaments made of polyester such as polyethylene terephthalate, because of the high initial modulus, high tensile strength, good fatigue resistance and satisfactory bending properties of this material, have shown promise in the development of radial tires in that they should make single-ply cord construction practical. This would have the desirable effect of reducing pantographic movements and axial compression of the tire. However, perhaps more than most of the other cord materials previously used, polyester monofilaments have proved to be especially difficult to adhere to natural rubber or to synthetic elastomers such as SBR rubber, butyl, ethylene-propylene copolymer or terpolymer, or stereospecific polybutadiene or polyisoprene elastomers.

It is an object of this invention to provide polyester, monofilaments capable of improved adhesion to rubber compounds, particularly for use in the fabrication of radial tires. A more specific object is to provide polyester monofilament capable of good adhesion to rubber and possessing a high initial modulus suitable for use as cord in the construction of radial tires. A still more specific object is to improve the adhesion characteristics of polyethylene terephthalate monofilaments by providing them with a cellulosic fiber cover. A further object is to provide radial tires possessing both high rigidity and comfortable riding quality, as well as an improved process for making such a tire. Still another particular object is to provide improved radial tire belts composed of essentially untwisted polyester monofilaments wrapped with hydrophilic multifilaments, i.e., filaments which are readily wetted by water. These and other objects, as well as the nature, scope and mode of operation of the invention will become more clearly apparent from the subsequent description and attached drawing, as well as from the appended claims.

In the absence of indications to the contrary it should be understood that all amounts and proportions of materials are expressed herein on a weight basis.

In the attached drawing:

FIG. 1 is a perspective view of a portion of a radial pneumatic tire, partially in section, formed essentially of radial ply cord fabric 1 in the carcass, a separate cord fabric 2 in the circumferential belt, and a rubber tread 5;

FIG. 2 is a side view of a composite cord embodying the present invention, comprising a high modulus polyester monofilament core 10 having a cotton yarn cover 11 wound helically thereover;

FIG. 3 is a cross-section of such a composite cord monofilament taken along line 3—3 in FIG. 2; and FIG. 4 is an enlarged view of a portion of a belt tire cord fabric embodying the present invention wherein the wrapped polyester monofilament cords 10 are the warp of the fabric and cotton picks 20 spaced about 0.3 inch apart are the weft, such cotton picks merely being required to keep the tire cords together during tire construction.

It has now been discovered that polyester monofilament possessing improved adhesion characteristics, and particularly suitable for use as cord in radial tires, can be made in accordance with the present invention by covering a polyester monofilament cord with a cellulosic yarn having a plurality of ends, i.e., by winding one or more layers of the cellulosic yarn helically around the cord. The use of two such layers wound in opposite directions can be beneficial in reducing or eliminating twist liveliness that is sometimes present when only one cover layer is employed.

Polyethylene terephthalate is a particularly useful polyester from which to make the monofilament cores of the improved cords though other fiber forming linear super polyesters having similar performance characteristics can be used likewise. More particularly, the monofilaments should have tenacity of from about 5 to 9 grams/denier, preferably 7 to 8 grams/denier; an initial modulus of from about 100 to 150 grams/denier, preferably 140 to 150 grams/denier; and, desirably, they should be chemically stable at temperatures at least up to about 150° C., i.e., at temperatures which are likely to build up in automotive rubber tires at highway speeds. The monofilaments usually have a circular cross-section but other configurations can be used likewise. For instance, the monofils may have a Y-shaped or X-shaped cross-section or have a pebbled or indented surface due to special fabrication procedures otherwise well known in the art. Such uneven surface characteristics of the monofil core tend to further provide additional pockets in the eventual wrapped core in which to trap the adhesive dip. This tends to further increase the pick-up and retention of the dip and can result in particularly good adhesion between such a cord and rubber. Cores composed of a single untwisted polyester monofilament of about 1500 to 2000 denier are particularly preferred, though lighter and heavier monofilaments, e.g., filaments weighing from about 500 to 4000 denier are also useful. Of course, the present invention can also be used to improve the adhesive properties of multifilament polyester cords, e.g., polyester yarns containing two to three ends or monofils.

The plural end yarn cover used in the present invention should be hydrophilic, in the sense of being able to absorb at least 30%, and preferably at least 60%, of water based on dry fiber weight. Accordingly, the cover is desirably composed of a natural or regenerated cellulose material such as viscose rayon, cotton or sisal. Viscose rayon is particularly preferred. Multifilament yarn weighing from about 500 to 2000 denier or more are suitable and those weighing from 1400 to 1700 denier are preferred. Typically, their degree of twist may be in the range of from about 0.5 to 1.5 turns per inch, e.g., about 1 turn per inch. Since this cover material is not intended to bear any substantial load its tensile strength is unimportant in the context of the present invention.

It is preferred to wind the hydrophilic cover filament on the polyester core to provide about 5 to 15 turns of cover filament per linear inch of core. Optimum adhesion, however, often is obtained at less than maximum wrapping level, e.g., at about 7 to 9 turns per inch.

Any suitable device such as a conventional cord twister can be used for wrapping the relatively thick and stiff monofilament cord with the pliable cellulosic cover. Due to the imbalance of properties of the two different materials the cellulosic yarn can be readily wrapped around the polyester filament without twisting the monofilament to any substantial degree.

The invention will now be further described in terms of an actual working example.

In this example wrapped monofilaments were made by using a commercial polyethylene terephthalate greige monofil as the inner yarn or core and wrapping these core yarns with different cover yarns by direct cording by a Bar Mag AC-O Direct Corder.

In one test an 1100 denier polyethylene terephthalate monofilament was used as the outer yarn and in a comparative test an 1100 denier commercial rayon monofilament was used. 12 wraps per inch of the respective wrapping was applied to the monofil core in each case. The properties of the unwrapped greige polyester monofil are shown in Table I.

TABLE I.—PROPERTIES OF GREIGE MONOFIL

| | |
|---|---|
| Linear density, denier | 2255 |
| Breaking strength, lb. | 31.2 |
| $E_{10}$,[1] percent | 2.8 |
| $E_B$,[2] percent | 10.9 |
| Tenacity (g./den.) | 6.3 |
| Initial modulus (g./den.) | 110 |

[1] Condensate of epichlorhydrin and 2,2-bis(4-hydroxyphenyl)propane.
[2] Elongation at break.

The two ends or wrapped monofils, as well as the unwrapped monofil, were then treated in the usual manner by dipping in adhesive and then drying and heat setting the dipped ends. The operation was performed in a Litzler Computreater at a line speed of 20 yards per minute, using a two-dip adhesive system. Dip No. 1 had the following composition:

| | Parts |
|---|---|
| "Epon 812" epoxy resin [1] | 9 |
| Water | 290.5 |
| "Aerosol OT" wetting agent [2] | 0.5 |
| | 300 |

[1] Condensate of epichlorhydrin and 2,2-bis(4-hydroxyphenyl)propane.
[2] Dioctyl sodium sulfosuccinate (mol. wt. 444).

After Dip No. 1 the ends were heated at 99° C. for 90 seconds while being held to normal length (0% stretch) and then dipped in Dip No. 2. This dip was made in two steps. First, a resorcinol-formaldehyde resin solution (Solution A) was prepared by mixing the following:

| | Parts |
|---|---|
| Water | 577 |
| Resorcinol | 21 |
| NaOH (50%) | 3.7 |
| Formaldehyde | 34 |
| | 635.7 |

After aging Solution A for five hours, Dip No. 2 was made by mixing the following:

| | Parts |
|---|---|
| Solution A | 635.7 |
| "Gen-Tac" vinyl pyridine latex (about 30% solids) | 292 |
| "Pliolite" SBR rubber latex (about 40% solids) | 73 |
| | 1,000.7 |

After the second dip the ends were held at about 200° C. for 90 seconds at 0% stretch. The resulting treated ends had the properties shown in Table II.

TABLE II.—EFFECT OF WRAPPING POLYESTER MONOFILAMENT WITH RAYON AND POLYESTER YARNS

| | Unwrapped monofil | Monofil wrapped with rayon | Monofil wrapped with polyester |
|---|---|---|---|
| B.S., lb | 31.0 | 36.6 | 39.1 |
| $E_{10}$, percent | 3.1 | 2.2 | 2.7 |
| $E_B$, percent | 11.2 | 13.8 | 17.3 |
| U Adhesion at 250° F., lb | 6.6 | 19.4 | 10.5 |
| Peel adhesion at 250° F., lb | | 45.5 | 28.5 |
| Dip pickup, percent | | 2.58 | 1.79 |

From Table II it can be seen that the U adhesion was only slightly better in the case of the monofilament which was wrapped with polyester multifilament than in the case of the unwrapped monofilament. On the other hand, wrapping the monofilament with rayon increased the adhesion very greatly. The adhesion of the rayon-wrapped sample was about three times that of the unwrapped monofilament and almost twice that of the polyester-wrapped monofilament.

Other data not reported here have shown that using the same 1100 denier rayon yarn as the wrapping but reducing the wrapping level from 12 wraps per inch to 7.8 wraps per inch increased the U-adhesion by more than 10%. Thus, it will be noted that maximum adhesion can be obtained at less than maximum wrapping levels.

In still other tests, instead of using the 18 mil (2255 denier) polyester monofil described above, two 9 mil polyester monofils were formed into a yarn and this 2×9 mil yarn was then wrapped with the same 1100 denier yarn described above, at the rate of 12.8 wraps per inch. The U-adhesion of this wrapped 2×9 mil cord was about 7% higher than that of the 18 mil monofil wrapped with 12 wraps per inch of the same rayon yarn. Thus, the use of a double monofil or multifilament can offer an advantage over a simple monofilament in the construction of wrapped cord when maximum adhesion is important. However, the cord with the double monofil core also had considerably greater elongation than the cord with the monofilament core (5.1% v. 3.4%) thereby making it less suited for use in radial tire belts or in any other use where high rigidity is important.

What is claimed is:

1. A composite cord which comprises a substantially untwisted load-carrying polyester monofilament core having an initial modulus of at least 80 grams per denier and a breaking elongation of less than 10%, said core having at least 5 wraps per inch of a fine denier hydrophilic yarn helically wound thereover.

2. A composite cord according to claim 1 wherein said core is polyethylene terephthalate monofilament having a linear density of at least 1300 grams per denier and a breaking strength of at least 25 pounds, and wherein said hydrophilic yarn is a cellulosic plural end yarn.

3. A composite cord according to claim 2 wherein said cellulosic plural end yarn is a rayon yarn.

4. A tire cord fabric comprising rayon-wrapped polyethylene terephthalate monofilament cords as defined in claim 3.

5. A rubber tire which contains a plurality of substantially untwisted polyester monofilament cords imbedded in a rubber, said cords comprising a helically wound fine denier cellulosic plural end yarn cover thereover as defined in claim 3.

6. A radial tire which comprises separate carcass and belt reinforcing structures imbedded in a rubber, said carcass structure comprising a ply of tire cord fabric disposed with its cords at a bias angle of about 90° to the mid-circumferential plane of the tire and said belt structure comprising a single ply of tire cord fabric disposed with its cords substantially parallel to the mid-circumferential plane of the tire, said belt structure being a cord fabric composed of wrapped polyester monofilament cord as defined in claim 4.

7. A radial tire according to claim 6 wherein both the carcass cords and the belt cords are rayon-wrapped polyester monofilaments.

8. A composite cord which comprises a core consisting of a plurality of substantially untwisted load-carrying polyester monofilaments, each of said monofilaments having an initial modulus of at least 80 grams per denier and an elongation of less than 10%, said core having at least 5 wraps per inch of a fine denier hydrophilic yarn helically wound thereover.

9. A rubber tire which contains a plurality of composite cords as defined in claim 8.

References Cited

UNITED STATES PATENTS

| | | | |
|---|---|---|---|
| 2,755,214 | 7/1956 | Lyons et al. | 57—140 XR |
| 2,895,525 | 7/1959 | Zugli | 152—354 |
| 2,901,884 | 9/1959 | Weinberger | 57—144 |
| 2,996,872 | 8/1961 | Porczynski | 57—140 |

FOREIGN PATENTS 593,309  3/1960  Canada.

ARTHUR L. LA POINT, *Primary Examiner.*

C. B. LYON, *Assistant Examiner.*

U.S. Cl. X.R.

57—140

UNITED STATES PATENT OFFICE
CERTIFICATE OF CORRECTION

Patent No. 3,429,354　　　　　　　　　　　　　　　February 25, 1969

Malcolm R. H. Brooks

It is certified that error appears in the above identified patent and that said Letters Patent are hereby corrected as shown below:

Column 1, line 30, cancel "and". Column 5, lines 13 and 14, "Condensate of epichlorhydrin and 2,2-bis(4-hydroxyphenyl)propane" should read -- Elongation at 10 lb. load --.

Signed and sealed this 31st day of March 1970.

(SEAL)
Attest:

Edward M. Fletcher, Jr.　　　　　　　　　　WILLIAM E. SCHUYLER, JR.
Attesting Officer　　　　　　　　　　　　　　　　Commissioner of Patents